United States Patent [19]

Ando

[11] 4,402,256

[45] Sep. 6, 1983

[54] PNEUMATIC SERVO BOOSTER

[75] Inventor: Hiromi Ando, Tokyo, Japan

[73] Assignee: Tokico Ltd., Kanagawa, Japan

[21] Appl. No.: 240,611

[22] Filed: Mar. 5, 1981

[30] Foreign Application Priority Data

Mar. 28, 1980 [JP] Japan .................................. 55-41222

[51] Int. Cl.³ .............................................. F15B 9/08
[52] U.S. Cl. ................................. 91/369 A; 60/547.1;
92/85 R
[58] Field of Search ................... 60/547 R; 91/369 A,
91/376 R, 369 R, 369 B; 92/85 R

[56] References Cited

U.S. PATENT DOCUMENTS 4,270,438 6/1981 Thomas .......................... 92/165 PR
4,282,799 8/1981 TakeUchi ........................ 91/369 A

FOREIGN PATENT DOCUMENTS 2009871 6/1979 United Kingdom ........... 92/165 PR

*Primary Examiner*—Abraham Hershkovitz

*Attorney, Agent, or Firm*—Wenderoth, Lind & Ponack

[57] ABSTRACT

A pneumatic servo booster includes a shell housing consisting of front and rear shells, a valve body slidably extending through the rear shell, a flexible diaphragm cooperating with the valve body for partitioning the interior of the shell housing into front and rear chambers, a plunger connected to an input rod and being slidably fitted in the valve body, a valve mechanism including a poppet valve and two valve seats which are formed respectively on the valve body and the plunger, and at least one rigid rod secured respectively to the front and rear shells and extending through the front and rear chambers. The valve mechanism communicates the two chambers when the poppet valve is spaced from the valve seat of the valve body and is seated on the valve seat of the plunger. A return movement restricting member is slidably mounted on the rigid rod and engages with the plunger, and resiliently restricts the return movement of the plunger at the end of the return stroke of the input rod.

3 Claims, 7 Drawing Figures

PNEUMATIC SERVO BOOSTER

BACKGROUND OF THE INVENTION

This invention relates to pneumatic servo boosters and, particularly to pneumatic servo boosters of the kind including a shell housing consisting of front and rear shells, a flexible diaphragm, a valve body slidably extending through an opening formed in the rear shell and cooperating with the diaphragm to partition the interior of the shell housing into front and rear chambers, a valve mechanism incorporated in the valve body and at least one reinforcement rod rigidly connected to the front and rear sheels respectively and extending through the interior of the shell housing.

The valve mechanism conventionally comprises a poppet valve cooperating with a valve seat formed on the valve body and with another valve seat formed on a plunger which, in turn, is connected to an input rod and is slidably mounted in the valve body. When the poppet valve is spaced from the valve seat of the valve body and is seated on the valve seat of the plunger, the two chambers in the housing are communicated with each other and are maintained at a first referential pressure such as a vacuum pressure, and when the poppet valve engages with the valve seat of the valve body and separates from the valve seat of the plunger, the communication between the two chambers is intercepted and a second referential pressure such as the atmospheric pressure is introduced into one of the chambers while the other chamber is maintained at the first referential pressure.

In the non-actuated condition of the servo booster of the aforementioned kind, the poppet valve is spaced from the valve seat of the valve body by a predetermined small clearance, and the poppet valve seats on the valve seat of the plunger. The clearance is effective in increasing the space between the poppet valve and the valve seat of the valve body in the return stroke of the servo booster, thereby improving the responsiveness of the servo booster in the return stroke. However, in actuating the servo booster it is necessary to firstly take up the clearance, i.e., the clearance constitutes an ineffective stroke in the actuating stroke of the servo booster, thereby deteriorating the responsiveness and the pedal feeling of the servo booster in the actuating stroke.

SUMMARY OF THE INVENTION

An object of the present invention is to provide a pneumatic servo booster having an improved responsiveness both in the actuating and return strokes.

The pneumatic servo booster according to the invention comprises a return movement restricting member which is provided in connection with the valve body and the reinforcement rod for resiliently restricting the return movement of the plunger when the valve body returns to its return position.

Preferably, the return movement restricting member is mounted on the valve body with one end slidably engaging with the reinforcement rod and the other end engaging with the plunger, and the arrangement is such that the member can displace in the direction of the axis of the servo booster by some amount with respect to the valve body and with respect to the plunger.

The foregoing and other objects and advantages of the invention will become apparent from the following description and the attached drawings.

DETAILED DESCRIPTION OF THE PREFERRED EMBODIMENTS

Figure 1:
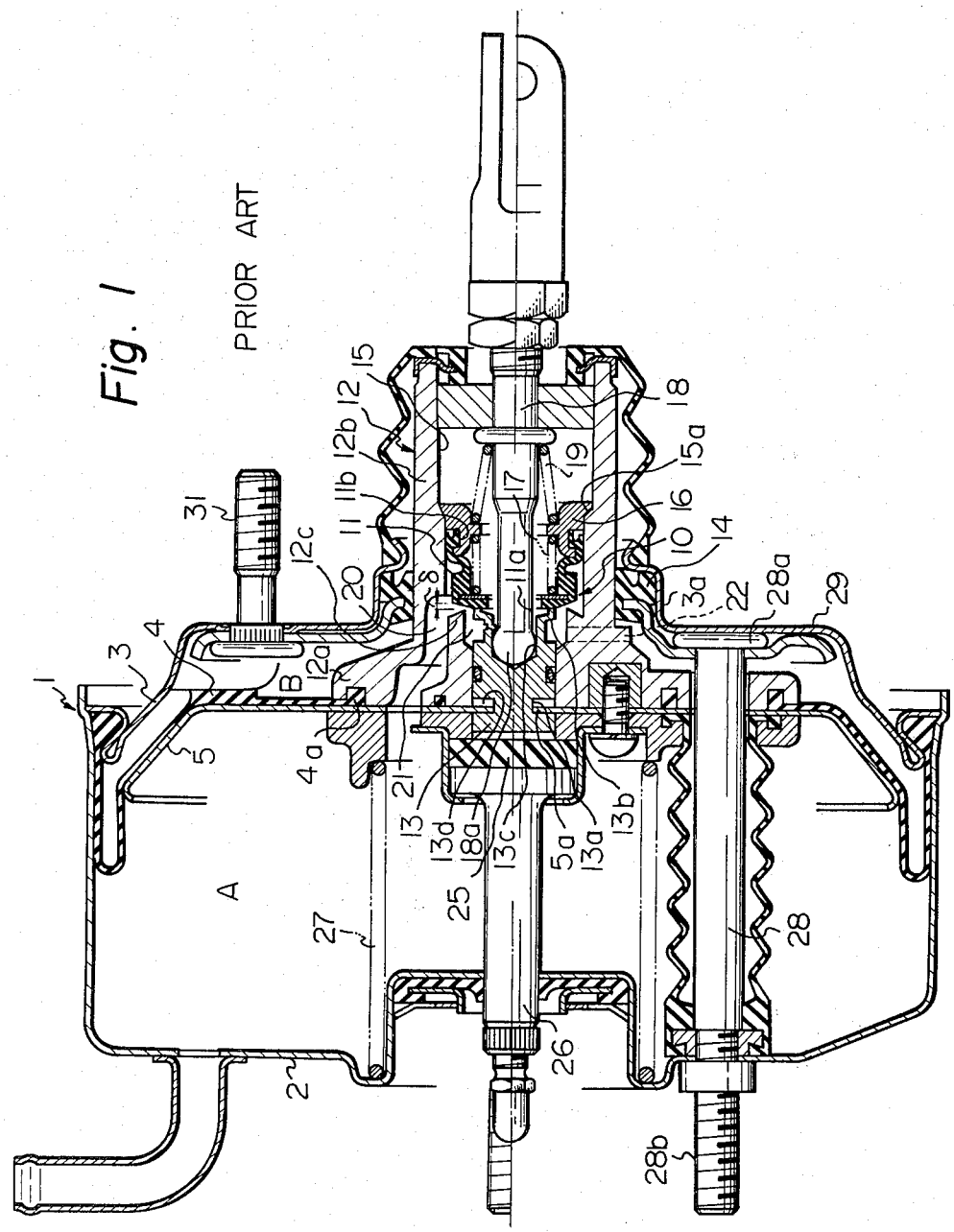
FIG. 1 is a longitudinal sectional view of a prior art servo booster, with the lower half thereof being a vertical cross-section and the upper half thereof being a horizontal cross-section.

FIG. 1 illustrates a typical prior art pneumatic servo booster which comprises a shell housing 1 consisting of front and rear shells 2 and 3, a flexible diaphragm 4 dividing the interior of the housing into two chambers A and B, and a piston plate 5 secured to the diaphragm 4. A poppet valve mechanism 10 connects or disconnects communication between the two chambers A and B and the communication between chamber B and the atmosphere. It will be noted that the chamber A is connected with a source of vacuum pressure such as an intake manifold of an engine of a vehicle. The poppet valve mechanism 10 comprises a poppet valve 11, an annular valve seat 12c formed on a valve body 12, and an annular valve seat 13b formed on a plunger 13. The valve body 12 slidably and sealingly extends through an opening formed in the rear shell 3 and has a large diameter portion 12a on the inner end thereof, to which the inner end 4a of the diaphragm 4 is connected. The plunger 13 is slidably fitted in the valve body 12 and is connected to an input rod 18. The relative axial movement of the plunger 13 with respect to the valve body 12 is restricted by the radially inner end 5a of the power piston 5 which is loosely fitted in an annular groove 13a formed in the outer circumference of the plunger 13. It will be noted that the power piston 5 has a non-circular opening to define the inner end 5a. A seal 14 is interposed between the rear shell 3 and a small diameter portion 12b of the valve body 12 so as to sealingly and slidably support the valve body 12. The small diameter portion 12b of the valve body 12 has a bore 15 therein, and a spring retainer 16 is fitted in the bore 15 and is retained by a shoulder 15a formed in the bore 15. The spring retainer 16 supports one end 11b of the poppet valve 11 and sealingly urges the one end 11b against the bore 15. The other end 11a of the poppet valve 11 cooperates with the valve seats 12c and 13b. The input rod 18 is rearwardly urged by a coil spring 19 which is supported on the spring retainer 16.

Further, there are provided two vertically spaced reinforcing rods 28 (only one is shown in the drawing) with the opposite ends thereof being secured respectively to front and rear shells 2 and 3. The rods extend through the front and rear chambers A and B and through a large diameter inner end portion or a flange portion 12a of the valve body 12 and the piston plate 5. The rods 28 loosely pass through the valve body 12 and the piston plate 5, thus, bellows-like extensible seal members surround the rods 28 in the region of the chamber A with the interior thereof communicating with the chamber B. The rods 28 effectively increase the rigidity of the shell housing 1, and are particularly advantageous when the rear shell 3 is mounted on a fixed part of the vehicle and a master cylinder of a hydraulic braking system is secured to the front shell 2 with the servo booster and the master cylinder being supported in a canti-lever style.

The pneumatic servo booster of the kind aforementioned is disclosed in UK Patent Application GB 2007981A published on June 20, 1979.

In the non-actuated condition of the servo booster shown in the drawing, the rearward movement of the plunger 13 is restricted by the inner end 5a of the piston plate 5 and a clearance $\delta$ is formed between the poppet valve 11 and the valve seat 12c of the valve body 12, while, the poppet valve 11 engages with the valve seat 13b of the plunger 13. The chamber B is connected with the chamber A through an axial passage 20 the valve body 12, an annular space 21, and a radial passage 22 which are formed in the valve body 12 respectively.

In actuating the servo booster, the input rod 18 is displaced leftward as viewed in the drawing, the poppet valve 11 engages with the valve seat 12c after taking up the clearance $\delta$ thereby disconnecting the communication between the chambers A and B. Thereafter, the poppet valve 11 separates from the valve seat 13b of the plunger 13 so that the chamber B is connected with the atmosphere through the radial passage 22, the annular space 21, a space formed in the bore 15 of the valve body 12 and around the input rod 18, an air cleaner, and an opening formed in the rear end of the small diameter portion 12b of the valve body. A pressure difference is generated between the chambers A and B, and the power piston 5 and the diaphragm 4 together with the valve body 12 displace leftward. An output force is transmitted through an output rod 26 to such as a piston of the master cylinder (not shown) of the hydraulic braking system of the vehicle. There is provided a reaction disc 25 to transmit the output force from the piston plate 5 to the output rod 26 and also to transmit a reaction force to the input rod 18 through the plunger 13.

It will be understood that the responsiveness of the servo booster in the actuating stroke is mainly determined by the maximum lift or the clearance between the valve seat 13b of the plunger 13 and the poppet valve 11 in the actuating stroke, and the responsiveness in the return stroke is mainly determined by the maximum lift or the clearance between the valve seat 12c of the valve body and the poppet valve 11 in the return stroke. In the prior art servo booster shown in the drawing, the maximum clearance between the valve seat 12c and the poppet valve 11 is equal to the clearance $\delta$ in the non-actuated condition. However, the clearance $\delta$ constitutes an ineffective stroke in the initial stage of the actuating stroke, thereby deteriorating the pedal feeling.

FIGS. 2-6 illustrate a pneumatic servo booster according to an embodiment of the invention and, since the construction of which is generally similar to the servo booster of FIG. 1, the same numerals have been applied to corresponding parts and detailed descriptions therefor are omitted.

Figure 2:
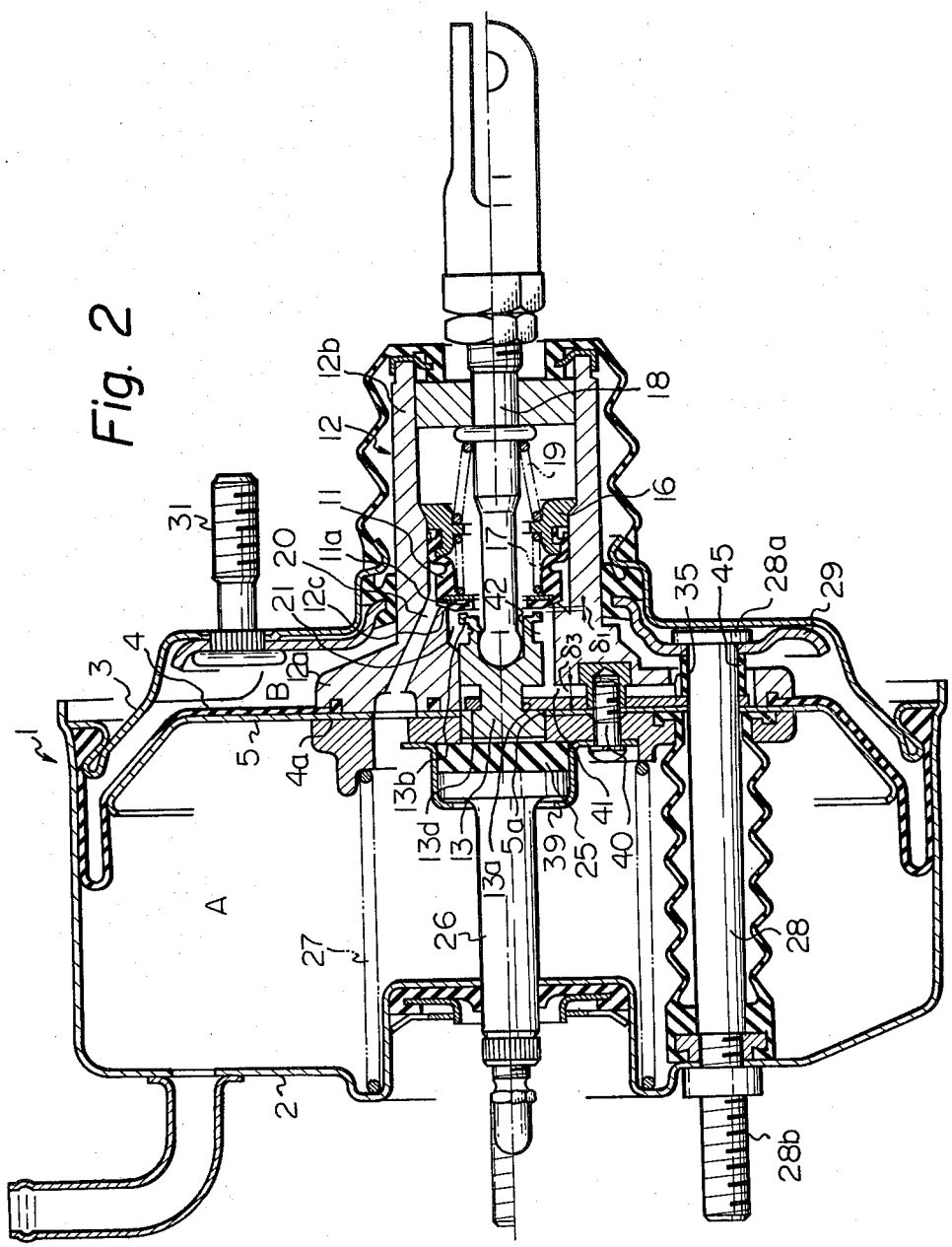
FIG. 2 is a longitudinal sectional view similar to FIG. 1, but showing a pneumatic servo booster according to the invention.
Figure 6:
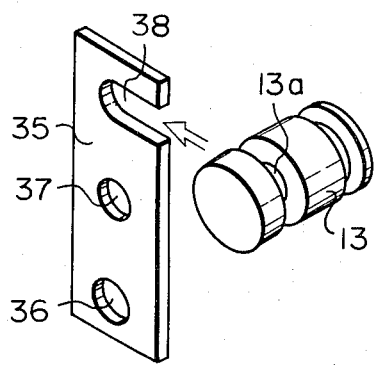
FIG. 6 is a perspective view of the return movement restricting member and the plunger incorporated in the servo booster of FIG. 2.

According to the invention, a return movement restricting member 35 restricts the return movement of the plunger 13 with respect to one of the rods 28. The return movement restricting member 35 is, as shown in FIG. 6, a generally rectangular plate and has a hole 36 at one end for slidably passing therethrough one of rods 28, a slot 38 at the other end for engaging with the annular groove 13a of the plunger 13 and a hole 37 for loosely passing therethrough a screw 40. The member 35 is received in a radial groove 41 (FIG. 2) of the valve body 12 and is displaceable therein in the direction of the axis of the valve body 12 by a predetermined amount 83. It will be understood that the groove 41 is formed in the front surface of the flange portion 12a of the valve body 12 and is closed by the piston plate 5 and a supporting member which are integrally connected to the flange portion 12a by utilizing a plurality of screws 40 (only one is shown in the drawings), and that there is a predetermined axial clearance between the groove 13a in the plunger 13 and the return movement restricting member 35 as shown in FIG. 2. Since the return movement or the relative axial movement of the plunger 13 with respect to the valve body 12 is restricted by the return movement restricting member 35 according to the invention it is not necessary to form a non-circular opening 5a as shown in FIG. 1 in the inner circumference of the piston plate 5 for engaging with the groove 13a of the plunger 13 thereby simplifying the assembly process.

There is provided a bush 45 formed of resilient material such as rubber on the rear end of the one rod 28 on which the member 35 is mounted. The bush 45 forms a resilient abutment which engages with the member 35 thereby restricting the return or the rightward movement of the member 35 with respect to the rod 28, accordingly, with respect to the shell housing 1.

The arrangement or the dimensional relationship in the axial direction of the parts is such that, in the initially assembled condition or at the condition when the chamber A is not connected to a source of vacuum pressure, and any force is not applied on the servo booster, the parts take the positions as shown in FIG. 2, namely, the valve body 12 and the piston plate 5 receive the spring force of a return spring 27 to take the most retracted position and the valve seat 12c engages with the poppet valve 11, and a small clearance $\delta_1$ is formed between the poppet valve 11 and the valve seat 13b of the plunger 13 which is urged rightward by the spring 19 and the rightward movement of which is restricted by the return movement restricting member 35. The clearance $\delta_1$ may be in the range of the manufacturing tolerance and, theoretically the clearance $\delta_1$ may be zero. However, it is essential that in the condition shown in FIG. 2 there is no clearance between the valve seat 12c of the valve body and the poppet valve 11. In this embodiment, the return movement restricting member 35 engages with annular wall 13d of the annular groove 13a in the plunger 13 to restrict the return movement of the plunger 13 and also abuts with the rear surface of the piston plate 5, thereby restricting the return movement of the piston plate 5 and the valve body 12. However, the return movement of the valve body 12 may be restricted by suitable means provided between the flange portion 12a of the valve body 12 and the rear shell 3 according to well-known techniques. In such case, a small clearance may be formed between the front surface of the return movement restricting member 35 and the piston plate 5.

Figure 3:
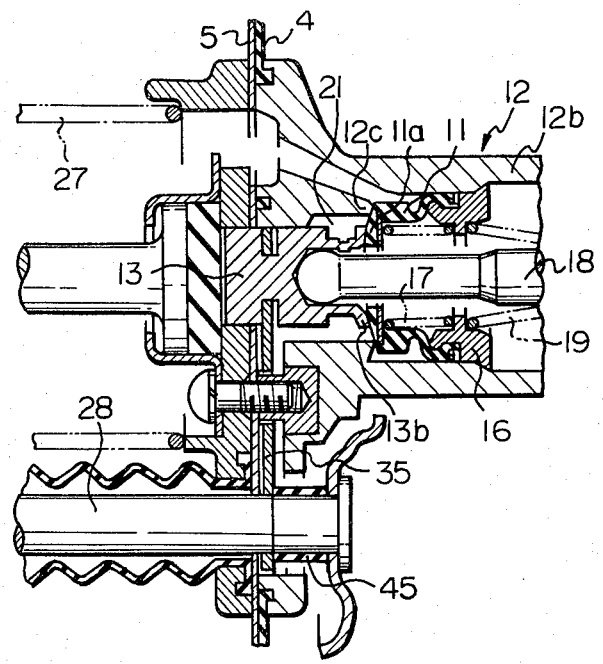
FIG. 3 is a partial sectional view showing the essential portion of FIG. 2 in the non-actuated condition of the servo booster with vacuum pressure being introduced into the booster.

Thereafter, the chamber A is connected to the source of vacuum pressure such as an intake manifold of an engine for driving the vehicle. The piston plate 5 and the valve body 12 displace leftward by a small distance until the valve seat 13b of the plunger 13 engages with the poppet valve 11 according to the differential pressure between the chambers B and A. If the volume of the chamber B in the condition of FIG. 2 is relatively large such that the pressure in the chamber B does not decrease sufficiently by the leftward movement of the valve body 12, the valve body 12 further displaces leftward so that the valve seat 12c of the valve body 12 separates from the poppet valve 11 thereby exhausting a portion of the air in the chamber B into the chamber A. The pressure difference between the chambers B and A decreases and the valve body 12 moves rearward and, finally, the servo booster takes the normal non-actuated condition as shown in FIG. 3. At that condition the poppet valve 11 engages with valve seats 12c and 13b so that the chamber B is intercepted from both of the chamber A and the atmospheric pressure.

Figure 4:
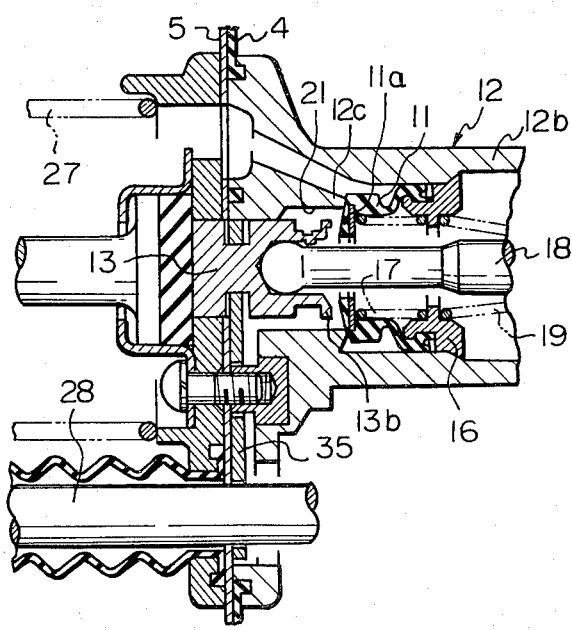
FIG. 4 is a partial sectional view similar to FIG. 3 but showing the actuating stroke of the servo booster.

In applying the brake, the input rod 18 is displaced leftward from the condition of FIG. 3 by such as depressing a brake pedal (not shown). The valve seat 13b of the plunger 13 instantly separates from the poppet valve 11, thus, the atmospheric air is introduced into the chamber B as shown in FIG. 4 and the servo booster actuates instantly. Thus, the ineffective stroke in the initial stage of brake application can substantially be reduced to zero, thereby improving the pedal feeling. The restricting member 35 does not restrict the movement of the plunger 13 and moves along the rod 28 in response to the movement of the valve body 12 and the piston plate 5. The maximum lift or the clearance of the poppet valve 11 relative to the valve seat 13b of the plunger 13 is mainly determined by the difference between the axial width of the annular groove 13a and the thickness of the restricting member 35.

Figure 5:
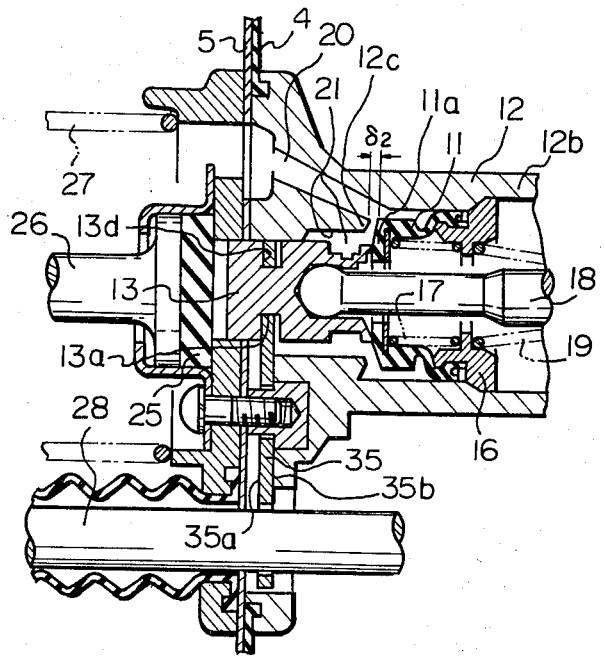
FIG. 5 is a partial sectional view similar to FIG. 3 but showing the return stroke of the servo booster.

FIG. 5 shows the return stroke of the servo booster. The restricting member 35 can move in the groove 41 of the valve body 12 in the axial direction to the condition shown in FIG. 5, whereat the restricting member 35 engages with the annular wall 13d of the annular groove 13a of the plunger 13 and, also, with the bottom or rear wall of the groove 41 in the valve body 12, thereby defining the maximum lift or clearance $\delta_2$ between the poppet valve 11 and the valve seat 12c of the valve body 12. The clearance $\delta_2$ is determined by $\delta_2 = \delta_3 - \delta_1$ and corresponds to the responsiveness in the return stroke of the servo booster. Thus, it is possible to substantially increase the clearance $\delta_2$ irrespective of the clearance $\delta_1$ and, therefore, the responsiveness in the return stroke of the servo booster can be improved.

At the end of the return stroke of the servo booster, the restricting member 35 firstly abuts the resilient bush 45, whereby the return movement of the input rod 18 and the plunger 13 is smoothly stopped. Thereafter, the valve body 12 returns to the position shown in FIG. 3.

Figure 7:
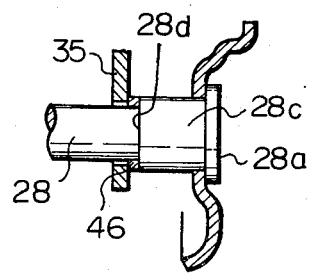
FIG. 7 is a partial sectional view of a modified form.

The resilient bush 45 may be replaced by a resilient ring 46 as shown in FIG. 7. The rod 28 is modified to have an increased diameter portion 28c so as to define an annular shoulder 28d to support the resilient ring 46.

As described heretofore, the restricting member 35 according to the invention can effectively restrict the return movement of the plunger 13 and the input rod 18 only at the end of the return movement, and the clearance between the valve seat 12c and the poppet valve 11 in the return stroke can be increased as compared with the prior art devices. Further, the poppet valve 11 can engage with both of the valve seats 12c and 13b in the non-actuated condition thus improving the pedal feeling. Further, the restricting member 35 abuts with resilient member 45 or 46 at the end of the return movement, and thus, the return movement of the input rod is smoothly stopped, thereby suppressing the generation of noise.

What is claimed is:

1. A pneumatic servo booster comprising:
   a shell housing including front and rear shells;
   a valve body slidably extending through an opening formed in said rear shell;
   a flexible diaphragm connected to said valve body and partitioning the interior of said shell housing into a first chamber adapted to be connected to a vacuum source and a second chamber;
   a plunger slidably fitted in a bore in said valve body and connected to an input rod extending through a rear end of said valve body;
   a valve mechanism incorporated within said valve body and including a poppet valve within said valve body, a first valve seat on said valve body and a second valve seat on said plunger, said valve mechanism including means for connecting said first and second chambers when said poppet valve is spaced from said first valve seat and seated on said second valve seat;
   said plunger being movable by said input rod in a forward direction away from said poppet valve during an actuating stroke, whereby the servo booster including said valve body actuates in said forward direction, and upon release of the input pressure to said input rod, said plunger moves in a rearward direction toward said poppet valve in a return stroke, whereby the servo booster including said valve body returns in said rearward direction;
   at least one reinforcing rod extending through the interior of said shell housing and between said front and rear shells and fixed thereto; and
   resilient return movement restricting means for restricting the return movement of said valve body with respect to said shell housing in said rearward direction, for restricting resiliently the return movement of said plunger with respect to said shell housing in said rearward direction, and for defining a normal non-actuated condition of the servo booster such that at a rearwardmost position of said plunger said poppet valve engages with both said first and second valve seats, said resilient return movement restricting means comprising a member slidably mounted on said reinforcing rod, and a resilient abutment on said reinforcing rod, said member abutting said plunger and said resilient abutment at said rearwardmost position of said plunger.

2. A servo booster as claimed in claim 1, further comprising an annular groove in the outer periphery of said plunger, said member including a radially inner end received in said annular groove and a radially outer end slidably fitted on said reinforcing rod.

3. A servo booster as claimed in claim 2, wherein said resilient abutment comprises a resilient bushing fitted on a rear end portion of said reinforcing rod.

* * * * *